Figure 1:
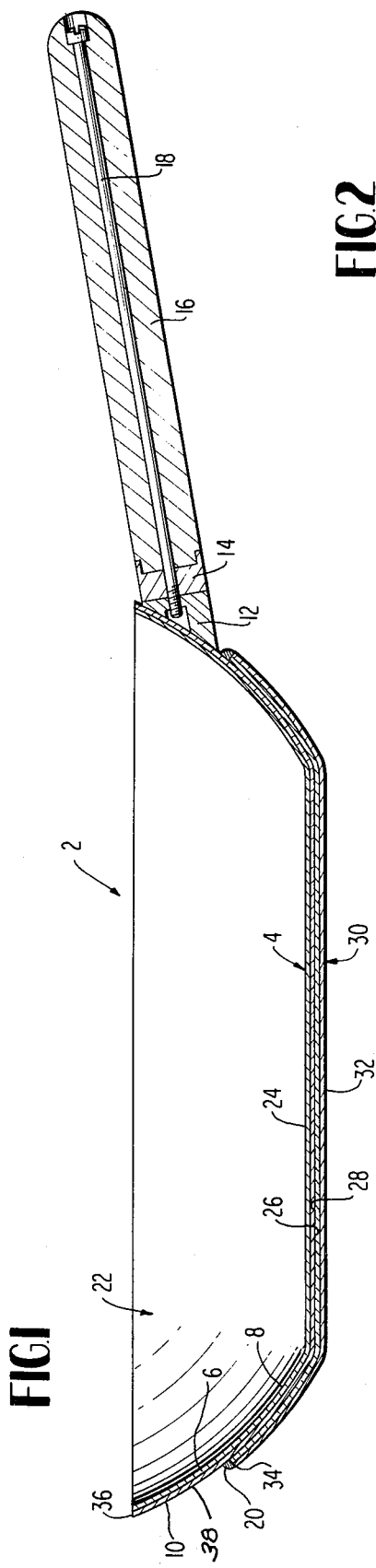

United States Patent [19]
Ulam

[11] 3,909,591
[45] Sept. 30, 1975

[54] COOKING VESSEL

[76] Inventor: John B. Ulam, 134 Mt. Blaine Dr., McMurray, Pa. 15317

[22] Filed: Oct. 29, 1973

[21] Appl. No.: 410,578

Related U.S. Application Data

[62] Division of Ser. No. 235,282, March 16, 1972, abandoned.

[52] U.S. Cl. ............. 219/438; 29/494; 29/DIG. 44; 219/544; 220/64
[51] Int. Cl.² ........................................ F27D 11/02
[58] Field of Search .......... 219/315, 436, 438, 439, 219/440, 544; 29/428, 478, 488, 494, 504, 611, DIG. 44; 126/390; 220/64

[56] References Cited
UNITED STATES PATENTS

| | | | |
|---|---|---|---|
| 1,946,220 | 2/1934 | Lotz | 219/440 |
| 2,046,125 | 6/1936 | Lacy | 219/436 |
| 2,101,996 | 12/1937 | Gerstenberg | 29/DIG. 44 |
| 2,471,663 | 5/1949 | Tietz | 126/390 X |
| 2,666,979 | 1/1954 | Van Dusen | 29/428 |
| 2,841,137 | 7/1958 | Chace | 126/390 |
| 3,031,735 | 5/1962 | Jepson | 219/438 |
| 3,064,112 | 11/1962 | Hanzel | 219/438 X |
| 3,345,735 | 10/1967 | Nicholls | 29/494 X |
| 3,363,307 | 1/1968 | Ulam | 29/488 |
| 3,436,816 | 4/1969 | Lemelson | 29/611 |
| 3,445,630 | 5/1969 | Ulam | 219/438 |
| 3,457,630 | 7/1969 | Schwartz et al. | 29/494 |
| 3,514,842 | 6/1970 | Beuyukian et al. | 29/494 |
| 3,788,513 | 1/1974 | Racz | 220/64 |

*Primary Examiner*—Volodymyr Y. Mayewsky
*Attorney, Agent, or Firm*—Browne, Beveridge, DeGrandi & Kline

[57] ABSTRACT

The bottom wall and lower sidewall portions of a cooking vessel have a greater thickness and an ornamentally contrasting exterior color from the upper sidewall portion thereof. The utensil is formed by uniting a cap to a main body, preferably by forming a hermetically sealed zone while in a vacuum. An electrical heating element may be located between the bodies. The ornamentally contrasting colors may be produced by a coating process or by using different metals for the exterior surfaces of the cap and main body.

12 Claims, 6 Drawing Figures

U.S. Patent  Sept. 30, 1975  3,909,591

COOKING VESSEL

This is a division, of application Ser. No. 235,282, filed Mar. 16, 1972, now abandoned.

This invention relates to a cooking vessel. In the past, cooking vessels made from sheet material have had a uniform wall thickness so that the entirety of the sidewalls have the same thickness as the bottom wall thereof. On occasions, the interior and exterior surfaces of such vessels have had different colors by virtue of the use of porcelain enamel coatings, chemical treatments which change the color of the metal or by making the vessel from composite sheet materials such as stainless steel clad to aluminum stock.

According to one aspect of the present invention, a cooking vessel includes a main body of uniform wall thickness and a cap of uniform wall thickness bonded to the main body and extending only partially up the sidewall of the main body, so that there is provided a cooking vessel which has a heavy bottom portion of greater thickness than the sidewalls. This improves the handleability of the vessel, but is particularly important in the sense that it improves the distribution of heat in the vessel and affords for efficient conduction of heat to the sidewalls.

The invention is preferably practiced also by providing the convex exterior surface of the cap with a different and ornamentally contrasting color from that of the convex exterior surface of the main body. This contrasting color may result by the use of dissimilar metals or by subjecting the vessel to a coating process.

Preferably, the vessel is formed by drawing two blanks of uniform thickness sheet material into cup-shaped bodies, one of which serves as the main body of the vessel and the other of which has a lesser height and serves as the cap of the cooking vessel. The term "cup-shaped" is used broadly to encompass concavo-convex shapes, dished bodies and flat-bottomed vessels with peripheral sidewalls. The bodies are nested together, with an electrical heating element placed therebetween if desired, and then bonded preferably in a vacuum chamber so as to form a hermetically sealed zone between the two bodies. Then, the united bodies are returned to atmospheric pressure which tends to establish firm heat transmissive contact between the two bodies. The vessel may then be completed in a conventional fashion by attaching a handle bracket to the sidewalls, and then connecting a handle and appropriate spacer means to the bracket. If the vessel includes an electrical heating element, a temperature sensing probe of conventional construction may be used, the leads of the heating element may be electrically connected to a suitable thermostatic temperature control device, and the handle of the utensil is provided with a temperature selection dial.

Preferably there is a difference in color between the main body and the cap. This difference may be achieved by making these elements of different materials or by making them from blanks of the same type of composite sheet material which are drawn in opposite directions so that their outer surfaces will be of different metals. Typically, an aluminum stock material clad with stainless steel is used, with the main body being drawn so that the stainless steel forms the upper and concave surface thereof, whereas the cap is drawn from the same type of composite sheet material but in the opposite direction so that the lower and convex surface thereof is stainless steel. Of course, when such a cooking vessel is made, the only exposed aluminum is on the portion of the sidewall of the main body which extends above the cap. The entire vessel may be subjected to a coating process which will change the color of the aluminum without affecting the color of the exposed stainless steel in the other portions of the vessel.

Figure 2:
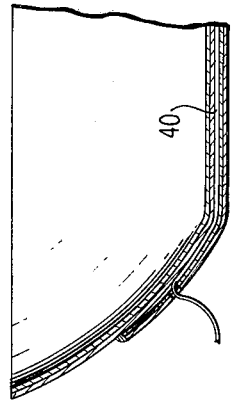
Figure 5:
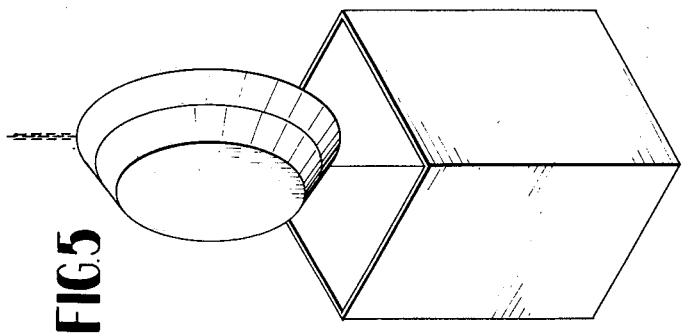
Figure 6:
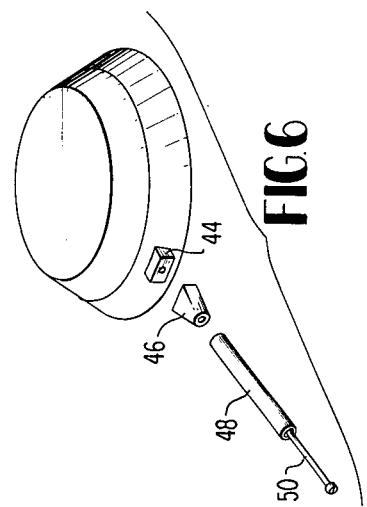
Figure 3:
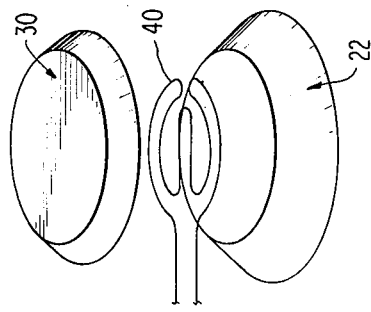
Figure 4:
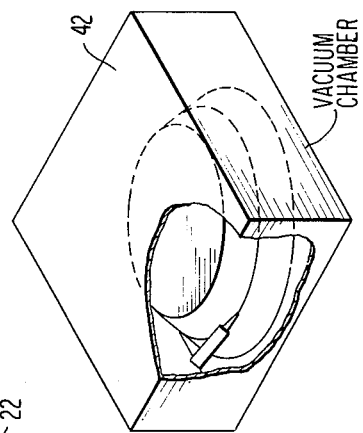

A more complete understanding of the invention is presented in the following description of a preferred embodiment and the accompanying drawings wherein FIG. 1 is a sectional view of a cooking vessel made according to the invention;

FIG. 2 is a sectional view of a portion of a vessel similar to that shown in FIG. 1, but also incorporating a heating element therewithin; and, FIGS. 3–6 diagramatically illustrate the principal steps in making a cooking vessel according to the invention. FIG. 3 shows the initial assembly of the cap onto the main body; FIG. 4 shows the bonding of the cap to the main body in a vacuum chamber so that a hermetically sealed zone is located between the cap and main body; FIG. 5 shows the subjection of the cooking vessel to a coloring process which selectively operates on only portions of the exposed metal; and, FIG. 6 shows the attachment of a handle bracket and a handle to the cooking vessel.

Referring to FIG. 1, it will be seen that the cooking vessel 2 is a frypan which has a relatively thick bottom 4 and peripheral sidewalls 6 which have a relatively thick lower portion 8 and a relatively thin upper portion 10. A handle bracket 12 is attached to the relatively thin upper portion of the sidewall and receives a spacer member 14 which mates with a handle 16. The handle is attached to the frypan by an elongated bolt 18 which has threads for engaging a threaded aperture in the bracket 12.

The cooking vessel 2 shown in FIG. 1 is formed of two dished metallic bodies which are nested together and permanently bonded by a peripheral band of weld metal 20. The main body 22 is of uniform thickness and may be formed from a blank of sheet material by a conventional drawing operation. It has a bottom wall with an interior surface 24 and an exterior surface 26 which is adjacent to and preferably in contact with the upper wall 28 of the cap member 30. The exterior bottom surface 32 of the cap member 30 is directly exposed to the heat source when the vessel is used for cooking. The cap member 30 has peripheral sidewalls which terminate at an upper edge 34 which lies below the upper edge 36 of the main body 22, so that the sidewall portion of the cap member 30 covers only a lower portion of the sidewall of the main body 22. The upper edge of the cap 30 may be rolled inwardly to enhance its appearance. The sidewall of the main body 22 has an upper exterior surface 38 which preferably is of a different color from the exterior surfaces of the cap and the interior surfaces of the main body 22.

Preferably, the main body 22 and cap 30 are formed of two-layer bodies of composite sheet material which are formed in opposite directions so that the interior surfaces of the main body 22 have the same metal as the exterior surfaces of the cap 30. In the illustrated embodiment, these surfaces are stainless steel, whereas the exterior surface of the main body 22 and the interior surface of the cap 30 are aluminum. With this particular construction, it will be observed that the principal visible metal is stainless steel which constitutes both the interior surface of the main body 22 and the exterior surface of the cap 30. The upper exterior surface of the main body 22 is the only area of exposed aluminum, and it is preferred that this area be subjected to a coating process which will change its color to enhance the overall appearance of the cooking vessel.

The term "coating process", as used herein, broadly encompasses processes such as porcelain enamel coating processes, painting, anodic oxide coating processes, electroplating processes and processes which form an oxide coating by chemical treatment. Such processes are well known in the art and are described in all editions of the Metals Handbook published by the American Society for Metals, which are incorporated herein by reference. They offer many colors, including black which will provide an esthetically pleasing cooking vessel.

The anodic oxide coatings are formed by anodic treatment of aluminum in an electrolyte bath which usually is of an acid character. A well-known process, known by the trademark Alumilite, is usually performed in an aqueous solution of sulfuric acid and is used to seal and color the aluminum surface. Another process suitable for use in connection with this invention is known by the trademark Duranodic 300.

Chemical coatings may be produced by placing the aluminum in a hot solution of sodium carbonate and potassium or sodium dichromate to create a grayish green coating on the aluminum surface. Processes of this type are known in the industry and are identified by trademark as Alrok coatings.

The preferred composite sheet material may be produced by known diffusion bonding processes to unite stainless steel to a clad aluminum product known by the trademark Duranel II. The latter material has a core of 1145 aluminum, clad on both sides with 3003 or 3004 aluminum. Of course, composite sheet materials of other metals such as stainless steel clad to copper may be used in the practice of this invention.

A typical process for constructing an article of cookware according to the invention is shown in FIGS. 3–6. FIG. 3 shows the preliminary nesting together of the main body 22 and cap 30, both of which have previously been drawn from blanks of stock sheet material of uniform thickness, so that the wall thickness of both the main body 22 and cap 30 are substantially uniform throughout. If the utensil is to be self-heating in nature, a conventional heating element 40 may be interposed between the nested members with the electrical leads therefrom passing outwardly through small openings in the sidewall of the cap. The heating element is preferably formed of flat wires which are covered by electrical insulating material. In some instances, a heating insulating material may be placed between the heating element 40 and the cap 30 so that excessive heat will not be transferred from the heating element 40 through the cap 30 and onto the surface which is supporting the vessel.

The cap 30 is then bonded to the main body 22 by conventional direct welding, brazing their surfaces together or preferably by welding them together as shown in FIG. 4. This may be done by electron beam welding while the members 22 and 30 are in a vacuum chamber 42. The welding is performed in the vacuum chamber so that there will be a subatmospheric pressure at the interface of the members 22 and 30 while the peripheral band of welding is located along the upper edge of the cap 30 to form an hermetically sealed zone at the interface. Of course, restoration of the welded members to the atmosphere will establish a pressure differential between the atmosphere and the evacuated hermetically sealed area between the members 22 and 30, so that the normal atmospheric pressure will force the sidewalls of the members 22 and 30 together and will force the bottom walls of these members into firm contacting relationship with each other or with the heating element 40 if such an element is used.

The appearance of the cooking vessel is improved by the step illustrated in FIG. 5 wherein the vessel is immersed in an electrolyte solution, using known anodizing technology to change the color of the exposed aluminum surface. In the preferred form of the invention, this surface is the upper exterior sidewall of the main body 22. This changes the color of the exposed aluminum and increases the color contrast between the two exterior sidewall portions of the vessel. The resulting vessel is therefore not only an excellent cooking vessel, but also has a new and desirable appearance. Alternatively, a porcelain enamel coating may be applied to the upper portion of the exterior surface of the sidewall of the cooking vessel, to provide the attractive contrasting color appearance.

The final step of the process is shown in FIG. 6 and includes the attachment of a handle bracket 44 to the vessel sidewall above the upper edge of the cap 30. The bracket may be attached to the cooking vessel by riveting or spot welding. Then, a spacer 46 and handle 48 are attached to the bracket by means of a relatively long bolt 50 which has its threaded end received in a threaded aperture of the bracket 44.

In instances where there is an electrical heating element 40, the electrical leads thereof will extend through the small openings in the sidewall of the cap 30. These leads may be attached in a conventional manner to an electrical connector which may be a separate unit or may be incorporated in the handle structure of the vessel. Also, thermostatic controls may be used, with a heating sensing probe made as a permanent or detachable part of the vessel. Suitable thermostatic controls are well known in the art and may readily be incorporated into the structure illustrated in FIG. 6. For example, the handle of the unit may be detachable from the cooking vessel and may incorporate an electrical connector and a temperature sensing probe. The outermost end of the handle may be provided with a temperature selection dial which has temperature-indicating graduations on its periphery and is rotatable about an axis concentric with the longitudinal axis of the handle.

From the foregoing, those skilled in the art will appreciate that the invention contemplates the structure and manufacture of cooking vessels which have an attractive and pleasing appearance and have excellent heat-distributing characteristics. The invention may be used for making frypans or other cookware items. Various metals may be used either of a solid or composite nature, and they may be bonded together by various techniques either at atmospheric or subatmospheric pressure. The contrasting colors of the vessel may result simply from the use of the different metals or by subjecting the materials to coating processes. Any known technique for constructing and attaching handles, electrical connectors or thermostatic controls may be used within the spirit of this invention. In view of the many variant factors, it is emphasized that the invention is not limited solely to the disclosed embodiments but encompasses other products and processes within the scope and spirit of the claims which follow.

I claim:

1. A cooking vessel comprising
   a metallic cup shaped main body having a bottom wall having upper and lower surfaces, said bottom wall being surrounded by an upstanding peripheral sidewall having interior and exterior surfaces,
   a metallic cap having a bottom wall with upper and lower surfaces,
   means permanently bonding the periphery of the cap to the main body, and means for forcing said upper surface of the bottom wall of the cap against said lower surface of the bottom wall of the main body, said means being an hermetically sealed zone at an interface between the main body and the cap, said hermetically sealed zone being at subatmospheric pressure to establish a pressure differential between the atmosphere and the hermetically sealed zone, said lower surface of the bottom wall of the main body being drawn by said pressure differential against said upper surface of the bottom wall of the cap by said pressure differential.

2. The cooking vessel of claim 1 wherein the main body and cap are each formed of composite sheet materials formed of two different metals.

3. The cooking vessel of claim 2 wherein the main body and cap are each formed of the same materials, with the entirely of the contacting and adjacent surfaces thereof being of the same metal.

4. The cooking vessel of claim 3 wherein stainless steel is the metal which forms the following: the upper surface of the bottom wall of the main body, the interior surface of the sidewall of the main body, and the lower surface of the bottom wall of the cap.

5. The cooking vessel of claim 1 wherein the lower surface of the bottom wall of the main body is in heat-transferring contact with the upper surface of the bottom wall of the cap, said cap serving to distribute heat to the bottom wall of the main body.

6. The cooking vessel of claim 1 wherein an electric heating element is located between the main body and the cap, said heating element being in heat-conducting relationship with the lower surface of the bottom wall of the main body.

7. The cooking vessel of claim 1 wherein the exterior surface of the sidewall of the main body has a portion extending above the cap provided with a surface colorant.

8. The cooking vessel of claim 7 wherein the surface colorant is porcelain enamel.

9. The cooking vessel of claim 7 wherein the surface colorant is of the anodic type.

10. The cooking vessel of claim 9 wherein the cap has upstanding sidewalls with interior and exterior surfaces which are shorter than the sidewall of the main body, the materials which form the following surfaces are incapable of having their color changed by an anodic process:
    the upper surface and interior surface of the main body;
    the lower surface and exterior surface of the cap.

11. The cooking vessel of claim 10 wherein the surfaces listed in claim 10 are of stainless steel.

12. The cooking vessel of claim 11 wherein the exterior surface of the main body is aluminum.

* * * * *